(12) United States Patent
Wei et al.

(10) Patent No.: US 12,314,428 B2
(45) Date of Patent: May 27, 2025

(54) MEDICAL SYSTEM AND AUTHORITY MANAGEMENT METHOD THEREFOR

(71) Applicant: BOE TECHNOLOGY GROUP CO., LTD., Beijing (CN)

(72) Inventors: Wei Wei, Beijing (CN); Qiongying Wang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 390 days.

(21) Appl. No.: 17/788,623

(22) PCT Filed: Aug. 4, 2021

(86) PCT No.: PCT/CN2021/110561
§ 371 (c)(1),
(2) Date: Jun. 23, 2022

(87) PCT Pub. No.: WO2022/052682
PCT Pub. Date: Mar. 17, 2022

(65) Prior Publication Data
US 2023/0021770 A1    Jan. 26, 2023

(30) Foreign Application Priority Data
Sep. 11, 2020   (CN) .......................... 202010953741.7

(51) Int. Cl.
*G06F 21/62*    (2013.01)
(52) U.S. Cl.
CPC ................................ *G06F 21/6245* (2013.01)

(58) Field of Classification Search
CPC ........ G06F 21/30; G06F 21/60; G06F 21/604; G06F 21/62; G06F 21/6245
See application file for complete search history.

(56) References Cited

U.S. PATENT DOCUMENTS

| | | | | |
|---|---|---|---|---|
| 7,460,020 B2* | 12/2008 | Reyes | ...................... | G08B 7/06 |
| | | | | 340/541 |
| 8,346,532 B2* | 1/2013 | Chakra | .................. | G16H 10/60 |
| | | | | 726/28 |
| 9,558,492 B2* | 1/2017 | Carrott | ............... | G06Q 20/3829 |
| 10,169,607 B1* | 1/2019 | Sheth | ...................... | G16H 15/00 |
| 10,681,024 B2* | 6/2020 | Badri | ...................... | H04L 63/06 |

(Continued)

FOREIGN PATENT DOCUMENTS

| | | |
|---|---|---|
| CN | 104050401 A | 9/2014 |
| CN | 104657928 A | 5/2015 |

(Continued)

*Primary Examiner* — Hosuk Song
(74) *Attorney, Agent, or Firm* — The Webb Law Firm

(57) ABSTRACT

Provided are a medical system and an authority management method therefor. The authority management method includes creating a second-level administrator for a hospital and assigning a menu, a function and a data access authority corresponding the second-level administrator to the second-level administrator in response to a role setting operation of a first-level administrator corresponding to a medical group layer, wherein the hospital is a subordinate institution of the medical group layer; and assigning a menu, a function and a data access authority corresponding to a user to the user in response to a role setting operation of the second-level administrator.

9 Claims, 9 Drawing Sheets

```
┌─────────────────────────────────────────────────────────┐
│ Create a second-level administrator for a hospital and  │
│ assign a menu, a function and a data access authority   │
│ corresponding the second-level administrator to the     │ ── S102
│ second-level administrator in response to a role        │
│ setting operation of a first-level administrator        │
│ corresponding to a medical group layer                  │
└─────────────────────────────────────────────────────────┘
                            │
                            ▼
┌─────────────────────────────────────────────────────────┐
│ Assign a menu, a function and a data access authority   │
│ corresponding to a user to the user in response to a    │ ── S104
│ role setting operation of the second-level administrator│
└─────────────────────────────────────────────────────────┘
```

(56) References Cited

U.S. PATENT DOCUMENTS

| | | | |
|---|---|---|---|
| 10,698,984 B2 * | 6/2020 | Sucilla | H04L 9/3226 |
| 11,430,570 B2 * | 8/2022 | Tee | G06F 21/6245 |
| 11,842,171 B2 * | 12/2023 | Kedida | G06F 8/30 |
| 11,916,969 B2 * | 2/2024 | Buck | H04L 63/0272 |
| 2017/0300627 A1 | 10/2017 | Giordano et al. | |

FOREIGN PATENT DOCUMENTS

| | | | |
|---|---|---|---|
| CN | 105373726 A | | 3/2016 |
| CN | 106302435 A | | 1/2017 |
| CN | 106952205 A | | 7/2017 |
| CN | 109948350 A | | 6/2019 |
| CN | 110957025 | * | 4/2020 |
| CN | 110957025 A | | 4/2020 |
| CN | 111079127 A | | 4/2020 |
| CN | 112100658 A | | 12/2020 |
| KR | 101729143 B1 | | 4/2017 |

\* cited by examiner

| Add | Edit | Delete |

▼ XXX Company
   ▼ North China
      XX hospital
▼ XXX Company1
   ▼ East China
      XXX hospital
▼ XXX Medical Group
   XX hospital
   XX hospital ● Region/business division    ○ Hospital Superior institution: Please enter superior institution

*Institution name: Please enter institution name

Contact number: Please enter contact number

Remarks: Please enter remarks

FIG. 9

| Add | Edit | Delete |

Geriatrics outpatient clinic
▼ Urology department
    Urology outpatient clinic
  Internal medicine outpatient clinic
  Surgical clinic
  Stomatology department
  Neurosurgery department
  Inpatient department Superior department: Please enter superior department

*Department name: Please enter department name

Department description: Please enter department description

FIG. 10

| Add | | | | | | |
|---|---|---|---|---|---|---|
| Serial number | Role name | Role ID | Role description | Affiliated hospital | Creation Time | Operation |
| 65 | doctor | First-level administrator | | XX hospital | A time of X:X:X on X month X day, X year | Edit  Delete  authority |
| 48 | hfyyadmin | Second-level administrator | | XX hospital | A time of X:X:X on X month X day, X year | Edit  Delete  authority |
| 45 | test1 | Second-level administrator | | XX hospital | A time of X:X:X on X month X day, X year | Edit  Delete  authority |
| 34 | cdyyadmin | Second-level administrator | | XX hospital | A time of X:X:X on X month X day, X year | Edit  Delete  authority |
| 10 | XX hospital administrator | Second-level administrator | test | XX hospital | A time of X:X:X on X month X day, X year | Edit  Delete  authority |
| 9 | XX hospital administrator | Second-level administrator | test | XX hospital | A time of X:X:X on X month X day, X year | Edit  Delete  authority |
| 4 | First-level administrator | First-level administrator | First-level administrator | | A time of X:X:X on X month X day, X year | Edit  Delete  authority |

A total of 7  10/page  < 1 >  go to 1 page

FIG. 11

| User name | Search | Add | | | | | | | |
|---|---|---|---|---|---|---|---|---|---|
| Serial number | User nme | Name | Phone number | Gender | Affiliated hospital | Affiliated department | Role | Status | Operation |
| 00000030 | XXXX | XXX | | Male | XX hospital | Gastroenterology department | XX hospital administrator | Valid | Edit  Delete |
| 00000019 | XXXX | XXX | XXXXXXXXXXX | Male | XX hospital | | hfyyadmin | Locked | Edit  Delete |
| 00000016 | XXXXX | XXX | XXXXXXXXXXX | Female | XX hospital | Geriatrics outpatient clinic | cdyyadmin | Valid | Edit  Delete |
| 00000014 | XXXX | XXX | XXXXXXXXXXX | Female | XX hospital | Urology department | cdyyadmin | Valid | Edit  Delete |
| 00000012 | XX | XXX | XXXXXXXXXXX | Male | XX hospital | Urology outpatient clinic | cdyyadmin | Valid | Edit  Delete |
| 00000009 | XXX | XXX | | Male | XX hospital | | XX hospital administrator | Valid | Edit  Delete |
| 00000008 | XXXX | XXX | | Male | XX hospital | | XX hospital administrator | Valid | Edit  Delete |
| 00000004 | XXXX | XXX | | Male | | | First-level administrator | Valid | Edit  Delete |

A total of 8  20/page  < 1 >  go to 1 page

FIG. 12

| Add | Edit | Delete |

▶ System management
▶ Patient center
▶ Follow-up Center
▶ AI
▶ Data statistics

| | |
|---|---|
| *Parent node | Please enter parent node |
| *Title | Please enter title |
| *Authority ID | Please enter authority ID |
| Icon | Please enter icon |
| Resource path | Please enter resource path |
| Request method | Please enter request method |
| *Type | Please enter resource request type |
| Ordering | Please enter order number |
| Front-end component | Please enter description |
| Front-end address | Iframe nested address |

FIG. 13

MEDICAL SYSTEM AND AUTHORITY MANAGEMENT METHOD THEREFOR

CROSS-REFERENCE TO RELATED APPLICATIONS

The present disclosure is a U.S. National Stage Application under 35 U.S.C. § 371 of International Patent Application No. PCT/CN2021/110561, filed on Aug. 4, 2021, which claims priority of China Patent Application No. 202010953741.7, filed on Sep. 11, 2020, the disclosure of both of which are incorporated by reference herein in entirety.

TECHNICAL FIELD

The present disclosure relates to a medical system and an authority management method thereof.

BACKGROUND

The medical system, which has been widely used nowadays, is an edge science that integrates various disciplines such as medicine, information, management and computer technology. The medical system is a kind of technical support and infrastructure for the operation of modern hospitals. The purpose of realizing the medical system is to strengthen the management of hospitals with more modern, scientific and standardized means, improve the work efficiency of hospitals, and improve the quality of medical care.

SUMMARY

According to an aspect of embodiments of the present disclosure, an authority management method for a medical system is provided. The authority management method comprises: creating a second-level administrator for a hospital and assigning a menu, a function and a data access authority corresponding the second-level administrator to the second-level administrator in response to a role setting operation of a first-level administrator corresponding to a medical group layer, wherein the hospital is a subordinate institution of the medical group layer; and assigning a menu, a function and a data access authority corresponding to a user to the user in response to a role setting operation of the second-level administrator.

In some embodiments, the hospital comprises: a first hospital and a second hospital different from the first hospital; the second-level administrator comprises: a first administrator and a second administrator different from the first administrator, wherein a menu, a function, and a data access authority corresponding to the first administrator are different from a menu, a function, and a data access authority corresponding to the second administrator.

In some embodiments, the user comprises: a first user and a second user different from the first user, wherein a menu, a function, and a data access authority corresponding to the first user are different from a menu, a function, and a data access authority corresponding to the second user.

In some embodiments, the authority management method further comprises: adding, deleting or modifying organization architecture information in the medical system in response to an organization maintenance operation of the first-level administrator.

In some embodiments, the authority management method further comprises: adding, deleting or modifying department information in an architecture of the hospital in response to a department maintenance operation of the second-level administrator.

In some embodiments, the authority management method further comprises: configuring administrator information of the second-level administrator in response to an information configuration operation of the first-level administrator; and configuring user information of the user in response to an information configuration operation of the second-level administrator.

In some embodiments, the authority management method further comprises: configuring a plurality of menu functions in response to a menu setting operation of the first-level administrator, wherein each of the plurality of menu functions corresponds to a role identification of at least one of the first-level administrator, the second-level administrator or the user.

In some embodiments, the organization architecture information is in a form of a tree menu, and comprises a region and a hospital, wherein the region comprises a subcategory comprising the hospital or a next level region, and the hospital is a lowest-level node of the organization architecture information.

In some embodiments, the authority management method further comprises: modifying a parent institution corresponding to a currently adjusted institution and ensuring that an address identification of the currently adjusted institution remains unchanged in a process of modifying the organization architecture information, wherein historical medical data of the currently adjusted institution is stored to the address identification.

According to another aspect of embodiments of the present disclosure, a medical system is provided. The medical system comprises: a receiving module configured to receive a role setting operation of a first-level administrator corresponding to a medical group layer or a role setting operation of a second-level administrator corresponding to a hospital, wherein the hospital is a subordinate institution of the medical group layer; and a role management module configured to create the second-level administrator for the hospital and assign a menu, a function and a data access authority corresponding the second-level administrator to the second-level administrator in response to the role setting operation of the first-level administrator, and assign a menu, a function and a data access authority corresponding to a user to the user in response to the role setting operation of the second-level administrator.

In some embodiments, the medical system further comprises: an organization management module configured to add, delete or modify organization architecture information in the medical system in response to an organization maintenance operation of the first-level administrator.

In some embodiments, the medical system further comprises: a department management module configured to add, delete or modify department information in an architecture of the hospital in response to a department maintenance operation of the second-level administrator.

In some embodiments, the medical system further comprises: a user management module configured to configure administrator information of the second-level administrator in response to an information configuration operation of the first-level administrator, and configure user information of the user in response to an information configuration operation of the second-level administrator.

In some embodiments, the medical system further comprises: a menu management module configured to configure a plurality of menu functions in response to a menu setting operation of the first-level administrator, wherein each of the plurality of menu functions corresponds to a role identification of at least one of the first-level administrator, the second-level administrator or the user.

According to another aspect of embodiments of the present disclosure, a medical system is provided. The medical system comprises: a memory; and a processor coupled to the memory, the processor configured to, based on instructions stored in the memory, carry out the method described above.

According to another aspect of the embodiments of the present disclosure, there is provided a non-transitory computer-readable storage medium on which computer program instructions are stored, which when executed by a processor implement the method described above.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which constitute part of this specification, illustrate embodiments of the present disclosure and, together with this specification, serve to explain the principles of the present disclosure.

The present disclosure may be more clearly understood from the following detailed description with reference to the accompanying drawings, in which:

FIG. 9 is a schematic diagram illustrating an organization management interface of a medical system according to an embodiment of the present disclosure;

FIG. 10 is a schematic diagram illustrating a department management interface of a medical system according to an embodiment of the present disclosure;

FIG. 11 is a schematic diagram illustrating a role management interface of a medical system according to an embodiment of the present disclosure;

FIG. 12 is a schematic diagram illustrating a user management interface of a medical system according to an embodiment of the present disclosure;

FIG. 13 is a schematic diagram illustrating a menu management interface of a medical system according to an embodiment of the present disclosure.

Figure 1:
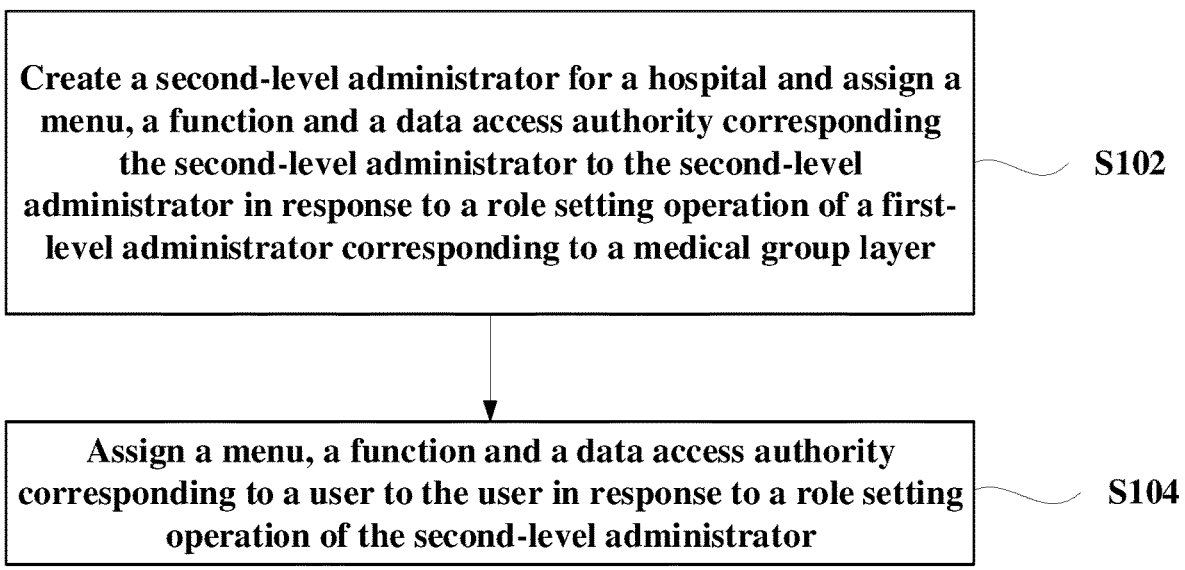
FIG. 1 is a flowchart illustrating an authority management method for a medical system according to an embodiment of the present disclosure.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail in conjunction with the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" or the like in the present disclosure does not denote any order, quantity or importance, but are merely used to distinguish between different components. A word such as "comprise", "include", or the like means that the element before the word covers the elements listed after the word, without excluding the possibility of also covering other elements.

All the terms (comprising technical or scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The inventors of the present disclosure found that, a medical system in the related art has weak support for group management, and for large and medium-sized medical institutions, each medical institution is basically managed as a separate entity. Although some medical systems provide some organization architecture and authority management functions, there are too many restrictions and the functions cannot be distributed. As a result, every time a system is launched, many maintenance operations will be carried out on the system. Over time, the maintenance operations of the system itself will become very cumbersome.

In view of this, embodiments of the present disclosure provide an authority management method for a medical system, which can reduce a burden of the maintenance operation as much as possible.

FIG. 1 is a flowchart illustrating an authority management method for a medical system according to an embodiment of the present disclosure. As shown in FIG. 1, the authority management method comprises steps S102 to S104.

In step S102, a second-level administrator is created for a hospital and a menu, a function and a data access authority corresponding the second-level administrator are assigned to the second-level administrator in response to a role setting operation of a first-level administrator corresponding to a medical group layer. The hospital is a subordinate institution of the medical group layer. Here, a function corresponding to the second-level administrator is a function (which, for example, comprises functional operations, such as system login, information viewing, department setting, role setting, etc.) that the second-level administrator can implement through the medical system. These functions can be visualized in a menu for being selected and clicked by the second-level administrator.

For example, initially, the system will create a first-level administrator (or super administrator) account in its database to enable a first-level administrator to log into the system, and configure a menu authority corresponding to the account. The first-level administrator is the group-level administrator. A medical group can comprise different hospitals, that is, the hospitals are subordinate institutions of the medical group. The first-level administrator can log into the medical system by entering an account, a password and a verification code. The medical system can return corresponding menu authority according to the authority of the current account. The first-level administrator can create role identifications for first-level and second-level administrators through the medical system. For example, each hospital's administrator acts as a second-level administrator, and the second-level administrator can select a corresponding hospital.

It should be noted that the role identification is a mark used to identify a role. The role identification comprises: a role identification of the first-level administrator, a role identification of the second-level administrator, and a role identification of the user. After a role is selected, a role identification can be set for the role. Each role identification is provided with corresponding menu authority.

After the first-level administrator performs a role setting operation, the medical system creates a second-level administrator for a corresponding hospital in response to the role setting operation, and assigns a menu, a function and a data access authority corresponding to the second-level administrator to the second-level administrator. For example, the medical system can issue the menu, the function and the data access authority corresponding to the second-level administrator to a sub-system corresponding to the hospital. Due to the selection of specific function menus, the second-level administrator can see these function menus after logging into the system, and can click on these menus to see specific function pages.

In step S104, a menu, a function and a data access authority corresponding to a user are assigned to the user in response to a role setting operation of the second-level administrator. Here, a function corresponding to the user are a function that the user can implement through the medical system (which, for example, comprises functional operations, such as system login, information viewing, etc.). These functions can be visualized in a menu for being selected and clicked by the user.

For example, after the second-level administrator (or also called a hospital administrator) logs into the system by entering an account, a password and a verification code, the medical system can return corresponding menu authority according to the authority of the current account. The second-level administrator can create role identifications for the second-level administrator and the user (e.g., a role of an employee, a customer, or a patient) through the medical system. The roles can comprise a variety of roles, such as follow-up doctors, chronic disease doctors, nurses, or marketers, etc. The second-level administrator can select a corresponding hospital and perform authority configuration (i.e., the selection of the function menus). In a case where specific function menus have been selected, the second-level administrator can see these function menus after logging into the system, and can click on these function menus to see specific function pages. After the second-level administrator performs a role setting operation, in response to the role setting operation, the medical system assigns a menu, a function and a data access authority corresponding to a user to the user.

Heretofore, an authority management method for a medical system according to some embodiments of the present disclosure has been provided. The method comprises: creating a second-level administrator for a hospital and assigning a menu, a function and a data access authority corresponding the second-level administrator to the second-level administrator in response to a role setting operation of a first-level administrator corresponding to a medical group layer; and assigning a menu, a function and a data access authority corresponding to a user to the user in response to a role setting operation of the second-level administrator. In the method, the medical system assigns a corresponding menu, a corresponding function and a corresponding data access authority to a lower-level administrator or user in response to a role setting operation of an upper-level administrator, which can facilitate the management of maintenance operations, and can reduce a burden of the maintenance operation as much as possible.

In some embodiments, the hospital may comprise a first hospital and a second hospital different from the first hospital. The second level administrator may comprise a first administrator and a second administrator different from the first administrator. For example, a menu, a function, and a data access authority corresponding to the first administrator are different from a menu, a function, and a data access authority corresponding to the second administrator. In the embodiment, different second-level administrators can be created for different hospitals, and different menus, functions, and data access authority can be assigned to different second-level administrators. This can realize diversified settings for second-level administrators and improve the management level.

In some embodiments, the user comprises: a first user and a second user different from the first user. For example, a menu, a function, and a data access authority corresponding to the first user are different from a menu, a function, and a data access authority corresponding to the second user. In the embodiment, different menus, functions, and data access authority can be assigned to different users. This can realize diversified settings for users and improve the management level.

In some embodiments, the authority management method further comprises: adding, deleting or modifying organization architecture information in the medical system in response to an organization maintenance operation of the first-level administrator. For example, organization architecture information can be added, deleted, or modified in the medical system before creating a second-level administrator for a hospital. For example, the organization architecture information is in a form of a tree menu. The organization architecture information can comprise a region and a hospital. The region comprises a subcategory. The subcategory comprises a hospital or a next level region. The hospital is a lowest-level node of the organization architecture information.

For example, FIG. 9 is a schematic diagram illustrating an organization management interface of a medical system according to an embodiment of the present disclosure. For example, as shown in FIG. 9, the regions may be: North China, East China, and the like. In FIG. 9, a superior institution refers to an upper level institution (i.e., a parent node) of the current institution. For example, if the current institution is North China, the superior institution is XXX Company. An institution name refers to a name of the current institution, such as North China, etc. In addition, FIG. 9 shows a business division that may be an institution at the same level as the region, for example, as shown in FIG. 9 of the present embodiment. In other embodiments, the business division may be a lower-level institution of the region and an upper-level institution of the hospital.

As shown in FIG. 9, when "add" is clicked, information about a currently added institution can be filled in on the right side of FIG. 9, such as information about its superior institution, institution name, contact number, and remarks. The superior institution can filled in to clarify which institution is the superior institution of the current institution, the institution name can be filled in to clarify what the current institution is, the contact number can be filled in to facilitate personnel to contact the institution by phone, and the remarks can be any information that needs to be remarked. Here, the contact number and remarks can be left blank. Here, the interface with "hospital" selected is similar to the interface on which "region/business division" is selected, which also comprises the superior institution, the institution name, the contact number, the remarks, and the like. In the above embodiment, the first-level administrator can set the organization architecture of the entire medical system through the medical system. The organization architecture can take the form of a tree menu. The organization architecture is divided into two categories: a region (or a business division) and a hospital. The hospital is a leaf node, that is, a lowest-level node, so the hospital has no subcategories, and it is only possible to create a next-level node for a region (or a business division). In this way, the organization architecture setting of the medical system by the first-level administrator is realized.

In some embodiments of the present disclosure, the superior institution of any node in the organization architecture can be modified, and if there is a subcategory under the node, the subcategory can also be modified together. For example, as shown in FIG. 9, a modification can be performed by moving the mouse to a certain institution, such as "North China", clicking the institution, and then clicking "edit" to modify information about "North China" (that is, information about its superior institution, institution name, contact number, and remarks).

"Delete" shown in FIG. 9 is used to delete a certain institution. For example, an institution can be deleted by moving the mouse on an institution, clicking the institution, and then clicking "delete". If the deleted node comprises subcategories, all the subcategories will also be deleted. For example, if "North China" is deleted, "XX Hospital" under "North China" will also be deleted.

In some embodiments, the authority management method further comprises: adding, deleting or modifying department information in an architecture of the hospital in response to a department maintenance operation of the second-level administrator. For example, department information can be added, deleted, or modified in an architecture of the hospital before assigning a menu, a function and a data access authority corresponding to a user to the user. For example, the departments here can be different departments in a hospital.

For example, FIG. 10 is a schematic diagram illustrating a department management interface of a medical system according to an embodiment of the present disclosure. As shown in FIG. 10, the departments may comprise: a geriatrics outpatient clinic, a urology department, a urology outpatient clinic, an internal medicine outpatient clinic, and a surgical clinic, etc. A superior department refers to an upper level department of a current department. A department name refers to the name of the current department. For example, if the current department is the urology outpatient clinic, the superior department of the current department is the urology department.

As shown in FIG. 10, when "add" is clicked, information about a currently added department can be filled in on the right side of FIG. 10, such as its superior department, department name, and department description. The superior department can filled in to clarify which department is the superior department of the current department, the department name can filled in to clarify what the current department is, and the department description can be any information that needs to be described (such as the department's contact information).

When information of a certain department needs to be modified, as shown in FIG. 10, through moving the mouse to a certain department, such as "urology outpatient clinic", clicking "urology outpatient clinic", and then clicking "edit", information about "urology outpatient clinic" (i.e., its superior department, department name and department description) can be modified.

"Delete" shown in FIG. 10 is used to delete a certain department. For example, a certain department (e.g., "urology department") can be deleted by moving the mouse on the certain department, clicking the certain department, and then clicking "delete". If the deleted department comprises subcategories, all the subcategories of the deleted department will also be deleted. For example, if "urology department" is deleted, "urology outpatient clinic" under "urology department" will also be deleted.

In the above embodiment, the second-level administrator can set a hospital department structure through the medical system. For example, the department structure may be in the form of a tree menu. The department structure can be set up at multiple levels, and the superior department of any node can be modified. If a node has a subcategory, the subcategory can also be modified. If a node is deleted, all the subcategories of the node will also be deleted. This realizes the setting of the hospital department by the second-level administrator.

In some embodiments, the authority management method further comprises: configuring administrator information of the second-level administrator in response to an information configuration operation of the first-level administrator. In the above embodiment, the first-level administrator can create administrator information of different second-level administrators through the medical system (for example, the administrator information may comprises accounts, passwords, identity information (such as identity numbers), and applet authorities, etc.). For example, a first-level administrator can add a second-level administrator's account, password, identity information (such as identity number), and applet authorities by an adding operation on a user management interface. For example, as shown in FIG. 12, after clicking "add", an addition window can be popped up, and the above information can be added in the addition window. In this way, administrator information of the second-level administrator can be configured. Each second-level administrator can log into the system according to an account and password created for the second-level administrator. After logging into the system, the second-level administrator can see a menu, a function and a data access authority corresponding to the account.

Here, the medical system can be loaded on a mobile communication terminal in the form of an applet. Both administrators and users have applet authorities, that is, both administrators and users can use the applet to log in and use the medical system. This can be more convenient to use the medical system, thereby improving the convenience of the medical system.

In some embodiments, on first use of the medical system, a first-level administrator may be predefined in the medical system. For example, information of the first-level administrator can be written into the medical system.

For example, FIG. 11 is a schematic diagram illustrating a role management interface of a medical system according to an embodiment of the present disclosure. Here, the role management interface comprises some role information that is different from the information of account, password, identity information, and applet authority of the second-level administrator described above which belongs to user information of administrators. Specifically, as shown in FIG. 11, the role information may comprise: a serial number, a role name, a role identification, a role description, an affiliated hospital, creation time, and an operation. The serial number is the serial number of a certain role. The role name is a name of a certain role. The role identification is a role identification corresponding to a certain role. For example, the role identification with a role name "doctor" is the first-level administrator (i.e., the super administrator in FIG. 11), and the role identification with a role name "XX hospital administrator" is the second-level administrator (i.e., the hospital administrator in FIG. 11). The role description is a brief description of the role. For example, if the role identification of a role is the first-level administrator, then the role description of the role can be "first-level administrator". The role description here can comprise any description about the role, which can make it convenient for others to understand some attributes of the role. The affiliated hospital refers to a hospital to which the current role belongs. The creation time is the time the role was created. The operation comprise: edit, delete, and authority. Here, "edit" is used to modify the relevant content of a role (for example, information such as serial number, role description, role identification, role description and affiliated hospital), "delete" is used to delete a role, and "authority" is used to set the authority for a role. For example, through clicking "authority", all the authorities corresponding to the role identification of the role can be shown, and then corresponding authorities can be set for the role by selecting these authorities.

For example, the authorities of "first-level administrator" (that is, menus that can be managed by a first-level administrator) comprise: a system management, a patient center, a follow-up center, AI (Artificial Intelligence), and data statistics. The authorities of "second-level administrator" (that is, menus that can be managed by a second-level administrator) comprise: a patient center, a follow-up center, AI, and data statistics. The authorities of "user" (that is, menus that can be managed by a user) comprise: a patient center, a follow-up center, and AI.

In some embodiments, the authority management method may further comprise: configuring user information of the user in response to an information configuration operation of the second-level administrator.

In the above embodiment, a second-level administrator can create user information of different users through the medical system (for example, the user information may comprise accounts, passwords, identity information, and applet authorities, etc.). In this way, user information can be configured for users. For example, a second-level administrator can add a user's account, password, identity information, and applet authority by an adding operation on a user management interface. For example, as shown in FIG. 12, after clicking "add", an addition window can be popped up, and the above information can be added in the addition window. Each user can log into the system according to an account and password created for the user. After logging into the system, the system can assign corresponding a menu, a function and a data access authority according to the authority of the account.

For example, FIG. 12 is a schematic diagram illustrating a user management interface of a medical system according to an embodiment of the present disclosure. As shown in FIG. 12, user information may comprise: a serial number, a user name, a name, a phone number, gender, an affiliated hospital, an affiliated department, a role, status, and an operation. The serial number is a serial number of a certain user. The user name is a name of a certain user. The phone number is a phone number of a certain user. The affiliated hospital is a hospital to which a certain user belongs. For example, a user whose serial number is "00000030" belongs to "XX hospital". The affiliated department is a department to which a certain user belongs. For example, a user whose serial number is "00000030" belongs to "gastroenterology department". The role is a role of a certain user. For example, a role of a user whose serial number is "00000030" is "administrator of XX hospital" The status indicates whether a user's status is valid. "Valid" means that a corresponding user can log in to the system, and "locked" means that the corresponding user cannot log in to the system. The operation can comprise "edit" and "delete". "Edit" is an operation used to modify content related to a user. For example, by clicking "edit" behind a user, the user's serial number, user name, name, phone number, gender, affiliated hospital, affiliated department, role, and status can be modified. "Delete" is an operation used to delete a certain user.

In some embodiments, the authority management method further comprises: configuring a plurality of menu functions in response to a menu setting operation of the first-level administrator. Each of the plurality of menu functions corresponds to a role identification of at least one of the first-level administrator, the second-level administrator or the user. For example, a plurality of menu functions can be configured in response to a menu setting operation of the first-level administrator before creating a second-level administrator for a hospital and after adding, deleting, or modifying organization architecture information in the medical system.

Figure 3:
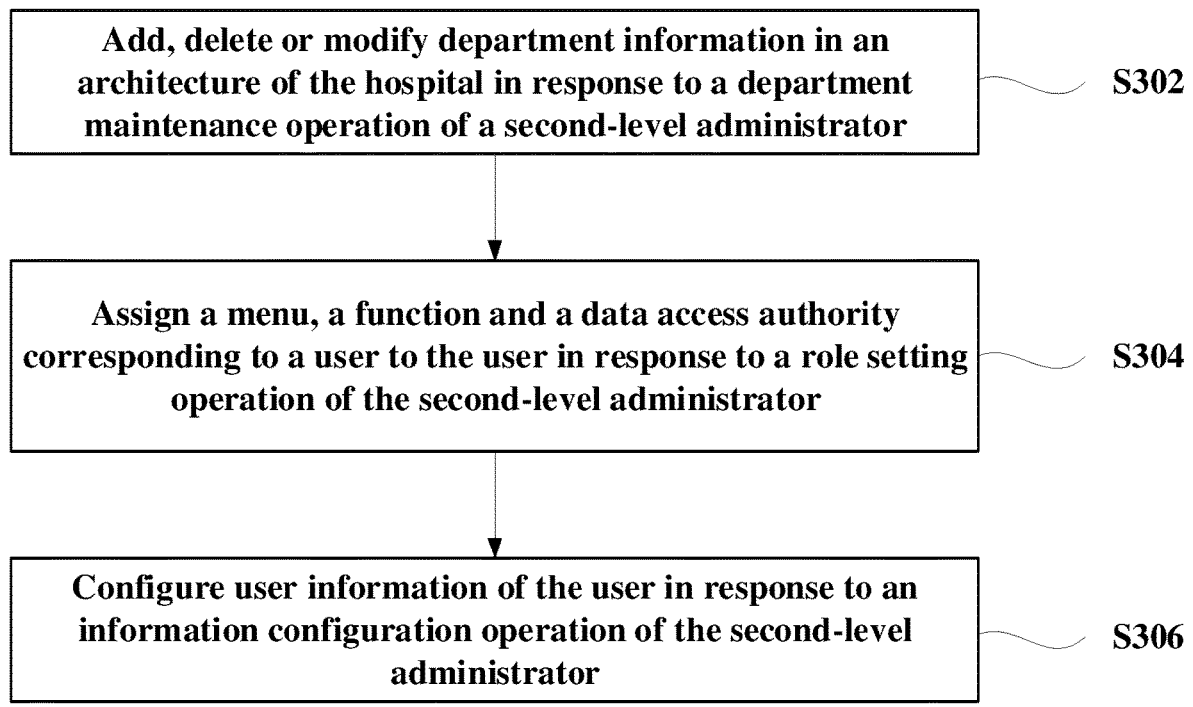
FIG. 3 is a flowchart illustrating an authority management method for a second-level administrator of a medical system according to an embodiment of the present disclosure.

For example, FIG. 13 is a schematic diagram illustrating a menu management interface of a medical system according to an embodiment of the present disclosure. As shown in FIG. 3, the menus may comprise: a system management, a patient center, a follow-up center, AI, and data statistics, etc. A menu can be added, edited, or deleted as needed. For example, through selecting the "system management" menu with the mouse, and then clicking "add", a lower-level menu can be added to the "system management" menu. When adding the lower-level menu, a parent node, a title and a authority identification of the lower-level menu can be set. Here, the parent node refers to an upper-level menu of the lower-level menu, the title refers to a name of the lower-level menu, and the authority identification refer to which one or more of the first-level administrators, the second-level administrators, or the users have a permission to access the lower-level menu. For example, in the process of setting a certain menu function, when an add box of the authority identification is clicked, three role identifications for the first-level administrator, the second-level administrator and the user can be popped up, which can be checked to select which one of more of the first-level administrator, the second-level administrator, or the user have a authority to access the menu.

In addition, as shown in FIG. 13, when adding a lower-level menu, an icon, a resource path, a request method, a type, an ordering, a front-end component, a front-end address and the like can also be set for the lower-level menu. Here, the resource path may be a URL (Uniform Resource Location) of a menu function. The request method can be selected from the Post method or the Get method. The type is a resource request type. The ordering is a sequence number of the added menu, which can be entered manually, for example. Description content of the menu can be input in a box behind "front-end component", for example, which can be any description content. The front-end address is an address of the added menu. Through the front-end address, a menu page corresponding to the address can be directly reached.

When a menu function needs to be modified, it can be modified through selecting the menu function with the mouse, and then clicking "edit" to modify the menu function. When a menu function needs to be deleted, it can be deleted through selecting the menu function with the mouse, and then clicking "delete" to delete the menu function.

In the above embodiment, the first-level administrator can set all the function menus of the entire medical system through the medical system. Each function menu has corresponding role identification (that is, only those role identifications have the authority to see the function menu, and have the authority to select the menu). The menu management can be dynamically configured. Through the configuration operation, the medical system can directly correspond to a front-end page, and then in the selection of a role authority, a corresponding function page can be displayed according to the selected menu. Therefore, the medical system has good flexibility and scalability.

Figure 2:
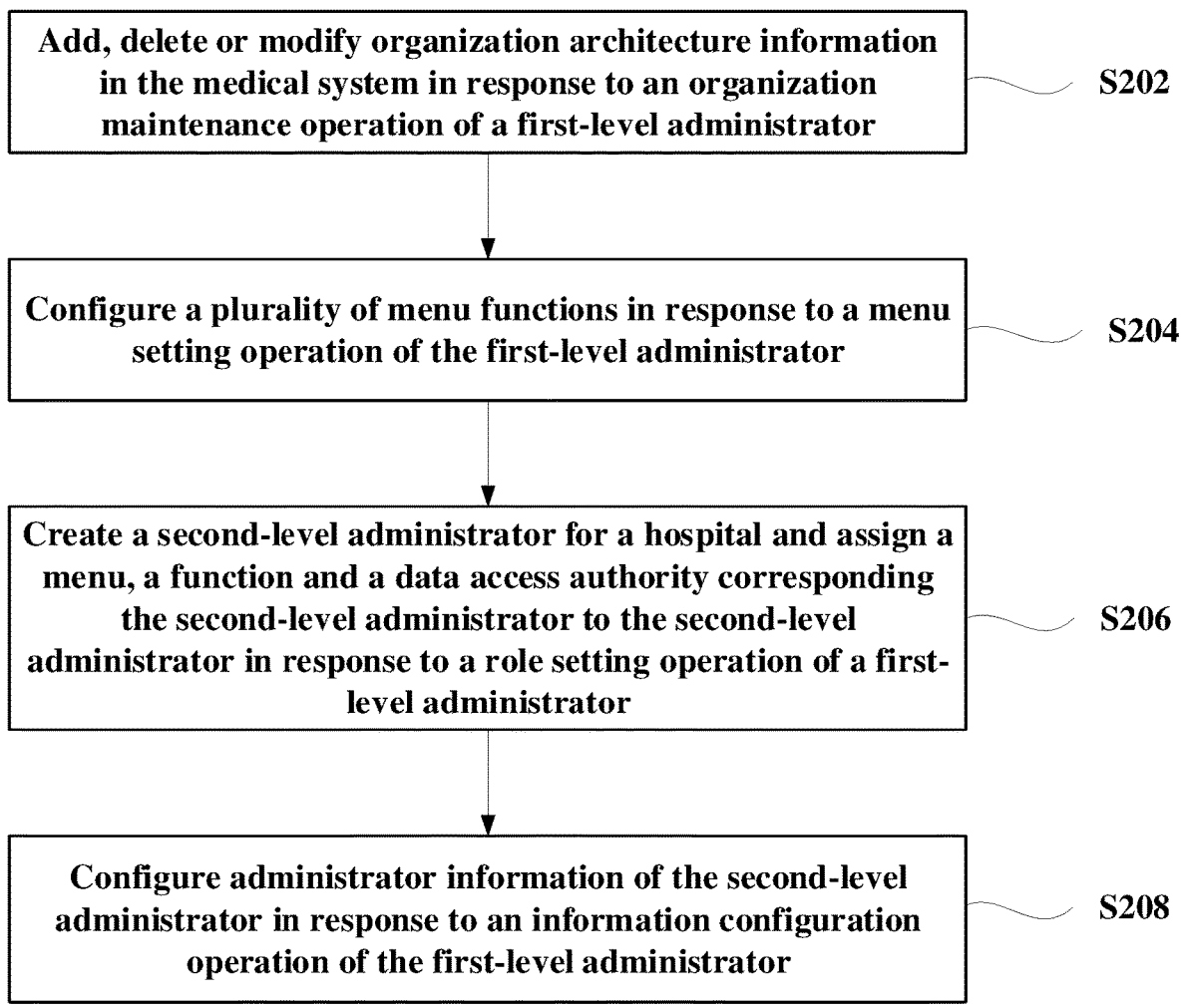
FIG. 2 is a flowchart illustrating an authority management method for a first-level administrator of a medical system according to an embodiment of the present disclosure.

FIG. 2 is a flowchart illustrating an authority management method for a first-level administrator of a medical system according to an embodiment of the present disclosure. As shown in FIG. 2, the method comprises steps S202 to S208.

In step S202, organization architecture information is added, deleted or modified in the medical system in response to an organization maintenance operation of a first-level administrator.

Here, the organization architecture can be maintained by the first-level administrator. The organization architecture adopts a tree-like hierarchical structure, and the number of layers is not limited. In the organization architecture, the hospital level can have an identification to identify that the level is a hospital.

In some embodiments, the authority management method further comprises: modifying a parent institution corresponding to a currently adjusted institution and ensuring that an address identification of the currently adjusted institution remains unchanged in a process of modifying the organization architecture information. historical medical data of the currently adjusted institution is stored to the address identification.

In the embodiment, when an institution is adjusted, the parent institution (that is, the upper-level institution) corresponding to the currently adjusted institution can be modified and it is ensured that the address identification of the currently adjusted institution remains unchanged, so as not to affect historical medical data stored at the address identification.

In some embodiments, the organization architecture may be a one-level structure of single hospital, a second-level hierarchical structure of a medical group and a hospital, or a four-level hierarchical structure of a medical group, a region, a business division, and a hospital. For example, the medical group is a parent institution of the region, the region is a parent institution of the business division, and the business division is a parent institution of the hospital. In other embodiments, the region and the business division may be institutions at the same level.

In step S204, a plurality of menu functions are configured in response to a menu setting operation of the first-level administrator.

For example, when a new menu is added, in response to a menu setting operation of the first-level administrator, the medical system may select a role identification corresponding to the newly added menu.

In step S206, a second-level administrator is created for a hospital and a menu, a function and a data access authority corresponding the second-level administrator are assigned to the second-level administrator in response to a role setting operation of a first-level administrator.

For example, in response to a role setting operation of a first-level administrator, the medical system may create a role with assigned a role identification (comprising "first-level administrator", "second-level administrator", and "user"). The first-level administrator can also authorize a role after creating the role. When authorizing the role, the medical system can display corresponding menus according to its role identification, and then the first-level administrator can selects specific menus and save his selection to complete role authorization.

In step S208, administrator information of the second-level administrator is configured in response to an information configuration operation of the first-level administrator.

For example, in response to the information configuration operation of the first-level administrator, the medical system may configure a hospital to which the second-level administrator belongs and a corresponding role of the second-level administrator, and then set a login name and a password. The medical system may also generate an administrator list comprising administrator information of second-level administrators of various hospitals.

Heretofore, an authority management method for a first-level administrator of a medical system according to some embodiments of the present disclosure has been provided. In the method, after the first-level administrator logs into the system, organization architecture information is added, deleted or modified in the medical system in response to an organization maintenance operation of the first-level administrator; then, in response to a menu setting operation of the first-level administrator, the medical system configures menu functions, wherein each menu function may correspond to at least one role identification. Thereafter, a second-level administrator is assigned to a hospital in response to a role setting operation of the first-level administrator, and a menu, a function and a data access authority corresponding to the second-level administrator are assigned to the second-level administrator; next, in response to an information configuration operation of the first-level administrator, the medical system configures administrator information of the second-level administrator. In this way, the corresponding setting of the medical system in response to a relevant operation of the first-level administrator is achieved, which can facilitate group maintenance and management.

In the above embodiment, a role management step (S206) may be performed after an organization management step (S202) and a menu management step (S204); a user management step (S208) may be performed after the role management step. In other words, the role management step may depend on the organization management step and the menu management step, and the user management step may depend on the role management step.

FIG. 3 is a flowchart illustrating an authority management method for a second-level administrator of a medical system according to an embodiment of the present disclosure. As shown in FIG. 3, the method comprises steps S302 to S306.

In step S302, department information is added, deleted or modified in an architecture of the hospital in response to a department maintenance operation of a second-level administrator. That is, after the second-level administrator logs in to the system, the second-level administrator can maintain a department structure of a corresponding hospital.

In step S304, a menu, a function and a data access authority corresponding to a user are assigned to the user in response to a role setting operation of the second-level administrator.

For example, in response to the role setting operation of the second-level administrator, the medical system can maintain roles created for the hospital (e.g., "doctor", "nurse", "administrator", etc.), and authorize a role after creating the role. When authorizing the role, the medical system can display corresponding menus according to its role identification, and then the second-level administrator can select specific menus and save his selection to complete role authorization.

In some embodiments, the second-level administrator cannot select a role identification of a first-level administrator when creating a role, nor can he see menus corresponding to the role identification of the first-level administrator, and the second-level administrator cannot operate functions owned by the first-level administrator.

In step S306, user information of the user is configured in response to an information configuration operation of the second-level administrator.

In response to an information configuration operation of the second-level administrator, the medical system can maintain users for a hospital to which the second-level administrator belongs. For example, the second-level administrator can select a department to which the user belongs and a role corresponding to the user, and then set a login name and a password. The medical system may also generate a user list comprising information of users of the hospital.

Heretofore, an authority management method for a second-level administrator of a medical system according to some embodiments of the present disclosure has been provided. In the method, after the second-level administrator logs into the system, department information is added, deleted or modified in an architecture of the hospital in response to a department maintenance operation of the second-level administrator; then, in response to a role setting operation of the second-level administrator, the medical system assigns a menu, a function and a data access authority corresponding to a user to the user; next, in response to an information configuration operation of the second-level administrator, the medical system configures user information of a user. In this way, the corresponding setting of the medical system in response to a relevant operation of the second-level administrator is achieved, which can facilitate group maintenance and management.

In the above embodiment, a user management step (S306) may be performed after a department management step (S302) and a role management step (S304). In other words, the user management step may depend on the department management step and the role management step.

In some embodiments, a first-level administrator is responsible for organization setting, menu setting, and specific role setting and user setting of the entire system, and can set a second-level administrator for each hospital. The first-level administrator can create the first-level administrator and the second-level administrator through the medical system. The second-level administrator is responsible for department setting, role setting, and user setting for each hospital. The second-level administrator can create an administrator and a user (for example, an employee) of his own hospital through the medical system. Users may be different roles. Different roles have different system menus, functions and data access authorities. After entering the system, users with different roles can have different system menus, functions and data access authorities. In some embodiments, the employees of each hospital can only see the relevant functions and data of their own hospital.

The management flow of these administrators and users will be described in detail below with reference to FIG. 4.

Figure 4:
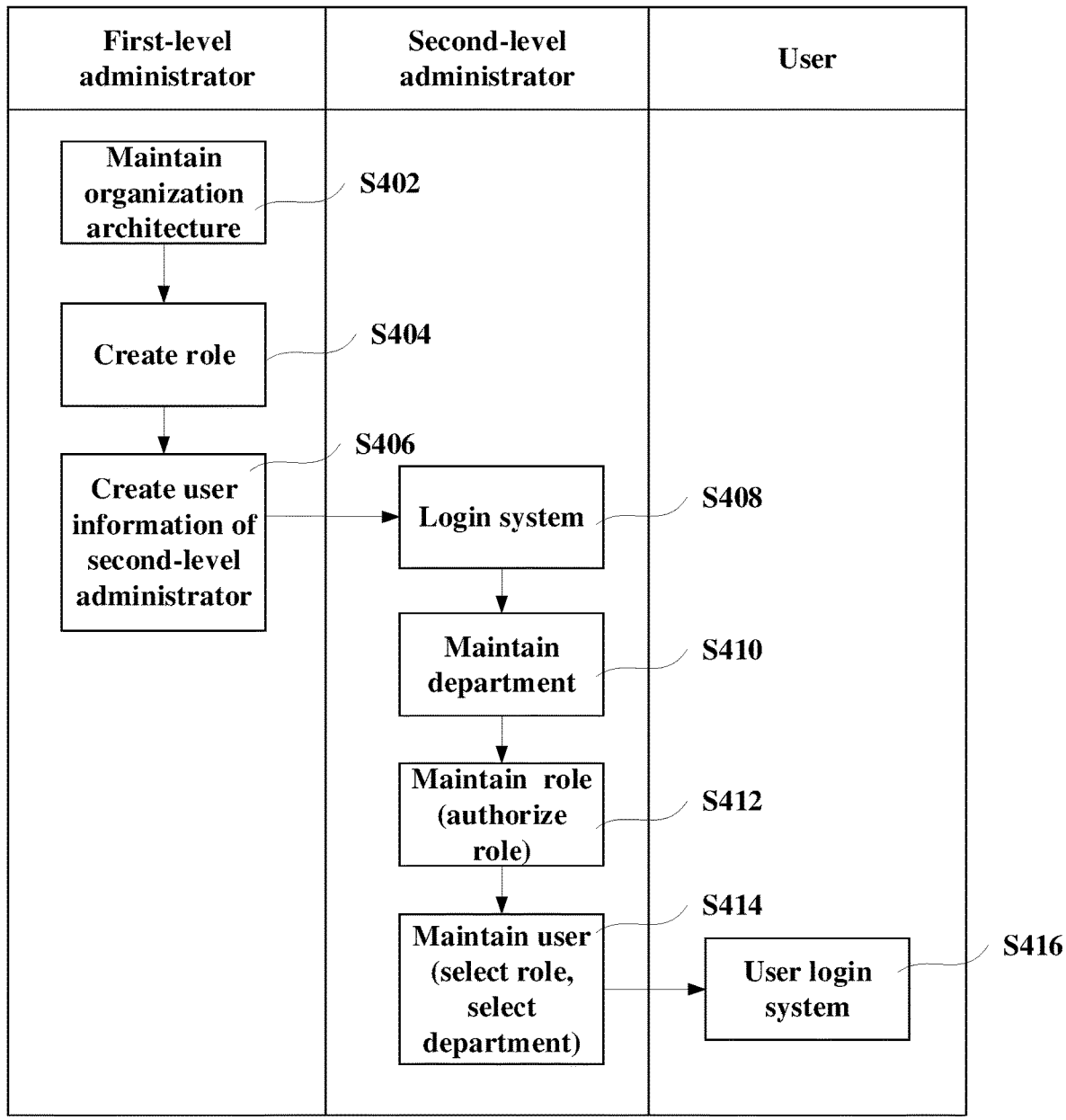
FIG. 4 is a flowchart illustrating an authority management method for a medical system according to another embodiment of the present disclosure.

FIG. 4 is a flowchart illustrating an authority management method for a medical system according to another embodiment of the present disclosure. As shown in FIG. 4, the method comprises steps S402 to S416.

In step S402, a first-level administrator first enters an organization management interface to set a organization architecture of an entire medical system.

In step S404, the first-level administrator creates a role of a second-level administrator, and assigns corresponding menus, functions and data access authority to the second-level administrator.

In step S406, the first-level administrator creates different administrator information for the second-level administrator, such as an account, a password, an identity number, and applet authority.

In step S408, the second-level administrator inputs his account, password and verification code to log in to the system.

In step S410, the second-level administrator enters a department management interface to maintain the department structure of a hospital that the second-level administrator is responsible for.

In step S412, the second-level administrator enters a role management interface, and creates a role identification of a user.

In step S414, the second-level administrator performs user maintenance, selects roles and departments for users, and creates user information for different users, such as accounts, passwords, identity number, and applet authorities.

In step S416, a user logs in to the system, and can see system a menus, a function, a data access authority assigned to the user, as well as functions and data related to his own hospital.

For example, if the user is a doctor, the user can select his professional title level (such as "chief physician", "associate chief physician", or "attending physician", etc.), and maintains his professional fields. The medical system can provide doctors with service type options (e.g., graphic consultation, medical report interpretation, video interrogation, etc.). For another example, if a patient selects a service through a mobile communication terminal as a user, a corresponding doctor list can be obtained, and information about each doctor's professional title and specialty can be viewed. Therefore, the medical system can obtain a service applied by the user according to the type of service provided to the user, and respond or interpret accordingly. For example, a doctor can have PC-side authority and applet authority, that is, the doctor can perform corresponding processing through programs on the PC-side or through applets on a mobile communication terminal; a patient has applet authority but not PC-side authority, that is, the patient can only perform corresponding processing through applets on a mobile communication terminal.

Heretofore, an authority management method for a medical system according to another embodiment of the present disclosure has been provided. Through the authority management method, it is possible to obtain the things that the first-level administrator, the second-level administrator and the user are respectively responsible for, and related operations that can be performed. Such a system setup can facilitate the maintenance of the medical system.

In the above authority management method for a medical system, the first-level administrator at the group layer is responsible for maintaining the organization architecture, creating a second-level administrator for a hospital, and giving the second-level administrator the authority to manage the hospital. After logging into the system, the second-level administrator can manage the departments, roles, users and authorities for his own hospital. After logging into the system, a user can use the system functions normally. In this way, the method can not only satisfy the requirements of group management, but also enable the hospital to be managed individually. Through hierarchical grading of administrative authorities, and balanced distribution of the work of each administrator, the work of system operation and maintenance can be reduced. Moreover, the above method also provides users with operable functions.

In some embodiments, the organization management step may be performed first, then the department management step, the menu management step, the role management step, and the user management step may be performed in this order. In other words, the department management step may depend on the organization management step, the role management step may depend on the organization management step and the menu management step, and the user management step may depend on the department management step and the role management step.

In some embodiments, if a hospital does not have a corresponding second-level administrator, the first-level administrator can also be given the management authority of the corresponding hospital to perform hospital-level data maintenance. After maintaining the hospital's department and user data, the hospital's departments and user number can be automatically obtained for the organization architecture at the group layer.

Figure 5:
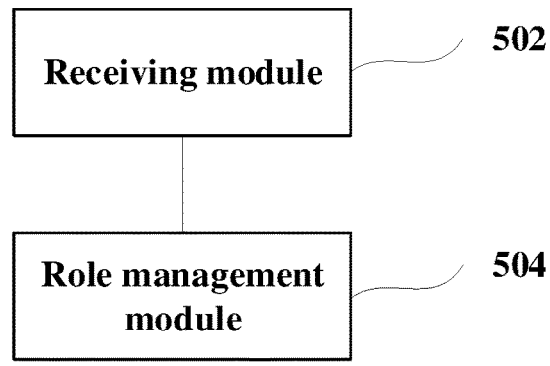
FIG. 5 is a schematic structural diagram illustrating a medical system according to an embodiment of the present disclosure.

FIG. 5 is a schematic structural diagram illustrating a medical system according to an embodiment of the present disclosure. As shown in FIG. 5, the medical system comprises a receiving module 502 and a role management module 504.

The receiving module 502 is configured to receive a role setting operation of a first-level administrator corresponding to a medical group layer or a role setting operation of a second-level administrator corresponding to a hospital. The hospital is a subordinate institution of the medical group layer.

The role management module 504 is configured to create the second-level administrator for the hospital and assign a menu, a function and a data access authority corresponding the second-level administrator to the second-level administrator in response to the role setting operation of the first-level administrator, and assign a menu, a function and a data access authority corresponding to a user to the user in response to the role setting operation of the second-level administrator. Here, the role management module 504 can be used to design a role for each hospital, and configure a menu, a function and a data access authority corresponding to the role.

Heretofore, a medical system in accordance with some embodiments of the present disclosure has been provided. The medical system comprises a receiving module and a role management module. The receiving module is configured to receive a role setting operation of a first-level administrator corresponding to a medical group layer or a role setting operation of a second-level administrator corresponding to a hospital. The role management module is configured to create the second-level administrator for the hospital and assign a menu, a function and a data access authority corresponding the second-level administrator to the second-level administrator in response to the role setting operation of the first-level administrator, and assign a menu, a function and a data access authority corresponding to a user to the user in response to the role setting operation of the second-level administrator. The medical system can facilitate the operation and maintenance management of the system, and reduce a burden of the maintenance operation as much as possible.

Figure 6:
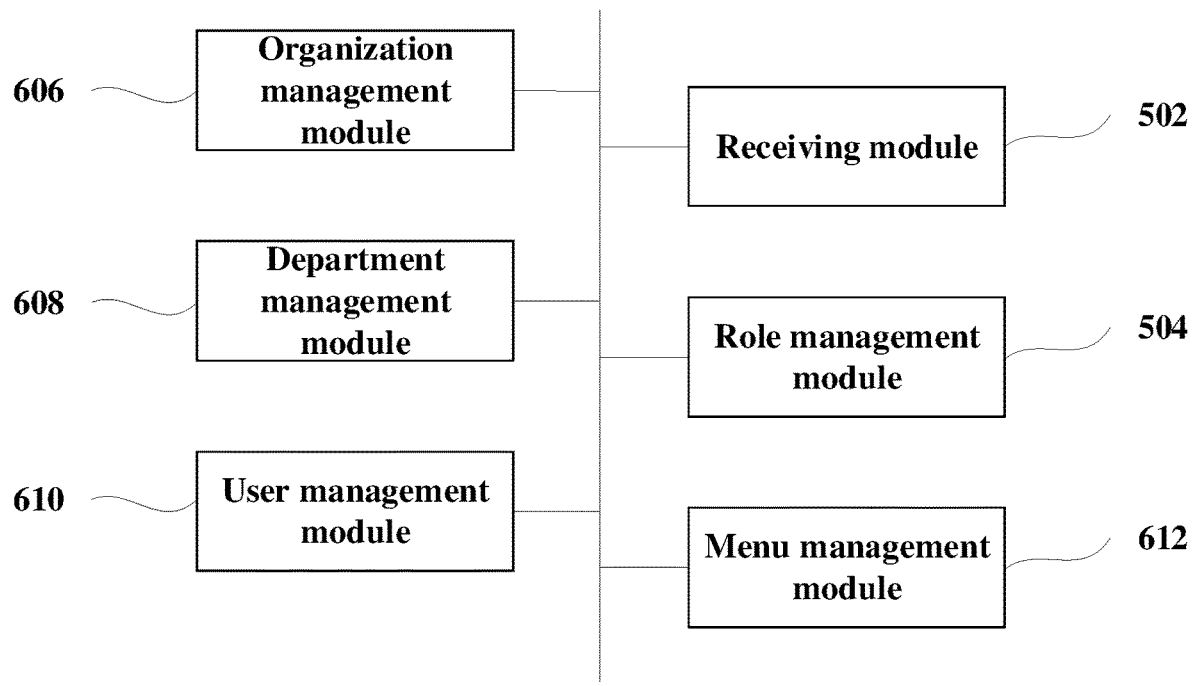
FIG. 6 is a schematic structural diagram illustrating a medical system according to another embodiment of the present disclosure.

FIG. 6 is a schematic structural diagram illustrating a medical system according to another embodiment of the present disclosure. As shown in FIG. 6, the medical system comprises the receiving module 502 and the role management module 504.

In some embodiments, as shown in FIG. 6, the medical system further comprises an organization management module 606. The organization management module 606 is configured to add, delete or modify organization architecture information in the medical system in response to an organization maintenance operation of the first-level administrator. Thus, the organization management module 606 can be used for the definition, design, and maintenance of organization hospitals.

In some embodiments, as shown in FIG. 6, the medical system further comprises a department management module 608. The department management module 608 is configured to add, delete or modify department information in an architecture of the hospital in response to a department maintenance operation of the second-level administrator. Thus, the department management module 608 can be used for the definition, design and maintenance of various departments within each hospital.

In some embodiments, as shown in FIG. 6, the medical system further comprises a user management module 610. The user management module 610 is configured to configure administrator information of the second-level administrator in response to an information configuration operation of the first-level administrator, and configure user information of the user in response to an information configuration operation of the second-level administrator. For example, the user management module 610 can be used to create, for each hospital, users, identity information, role information (whether a role is assigned with PC (Personal Computer)-side authority), mobile terminal-side authority and the like, and can set status such as valid or locked for the users.

In some embodiments, as shown in FIG. 6, the medical system further comprises a menu management module 612. The menu management module 612 is configured to configure a plurality of menu functions in response to a menu setting operation of the first-level administrator. Each of the plurality of menu functions corresponds to a role identification of at least one of the first-level administrator, the second-level administrator or the user. Here, the menu management module 612 can be used for the configuration, design, maintenance of each menu function in the system, as well as the configuration of the corresponding relationship with a front-end page.

In some embodiments, data related to the role management module 504, the organization management module 606, the department management module 608, the user management module 610, and the menu management module 612 can be stored in a database.

In some embodiments, the medical system may comprise at least one of a PC-side system or a mobile communication-side (or applet-side) system. For example, the PC-side system can be used by hospital personnel, and applets on the mobile communication side can be used by hospital personnel and customers. Of course, those skilled in the art can understand that the medical system can be set only on the PC side, or can be set only on the mobile communication side, or can also be set on both the PC side and the mobile communication side.

Users on the PC side can have three role identifications: first-level administrator, second-level administrator, and hospital employee (a type of user). It should be noted that the role identification here is not equal to the role, and can be used to distinguish function modules that can be seen for selection. The roles on the PC side can be set by the first-level administrator and the second-level administrator, and the number of the roles is not limited, which can be configured according to the specific needs of each hospital. The first-level administrator can create a first-level administrator and a second-level administrator, and the second-level administrator can create an administrators and users of his own hospital. For example, users can be employees in various roles. The first-level administrator is responsible for the organization management module, the menu management module, the role management module and the user management module. The second-level administrator is responsible for the department management module, the role management module, and the user management module.

The applet side is suitable for 4 types of roles: administrators, doctors/nurses, visitors/customers and marketers. Here, employees, doctors/nurses, visitors/customers, and marketers are all users of specific functions. Employees can see function pages corresponding to specific menus (for example, chronic disease card, follow-up management, health prescription, graphic consultation, widgets and statistics).

In the above medical system, each second-level administrator can set various roles for his own hospital, and assign different authorities to the roles to meet the needs of different hospitals that may have different demands for roles and authorities. The data of each hospital does not interfere with each other. Each user can have multiple roles, and there is no need to set authority for a user individually. Different role authorities can be assigned according to the role characteristics set by the user to achieve the final user authority setting. The roles authority of users on the PC side are separate from the roles authority of users on the mobile communication side (such as, on a mobile phone), and can be adjusted according to their needs, thereby increasing the flexibility and scalability of the system. The administrator of each hospital can set the department level of his own hospital. Departments and various functional data of hospitals do not affect each other, thus making the system setup more flexible.

The above medical system can fully meet the needs of the expansion and change adjustment of the hierarchical organization architecture without any restrictions, and does not affect the historical medical data. In this medical system, authorities are managed hierarchically, and corresponding functions are assigned, so that management work can be distributed in a balanced manner and the difficulty of operation and maintenance can be reduced. In addition, each piece of medical data corresponds to an institution code, so that unified access to the operation data of each institution can be achieved at the group layer.

Figure 7:
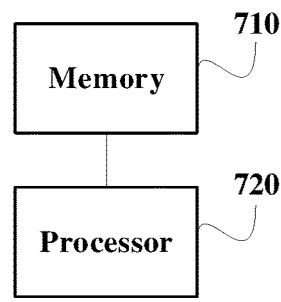
FIG. 7 is a schematic structural diagram illustrating a medical system according to another embodiment of the present disclosure.

FIG. 7 is a schematic structural diagram illustrating a medical system according to another embodiment of the present disclosure. The medical system comprises a memory 710 and a processor 720.

The memory 710 may be a magnetic disk, flash memory or any other non-volatile storage medium. The memory is used for storing instructions of the embodiment corresponding to at least one of FIGS. 1 to 4.

The processor 720 is coupled to memory 710 and may be implemented as one or more integrated circuits, such as a microprocessor or microcontroller. The processor 720 is used to execute instructions stored in the memory to facilitate the operation and maintenance management of the system, and reduce a burden of the maintenance operation as much as possible.

Figure 8:
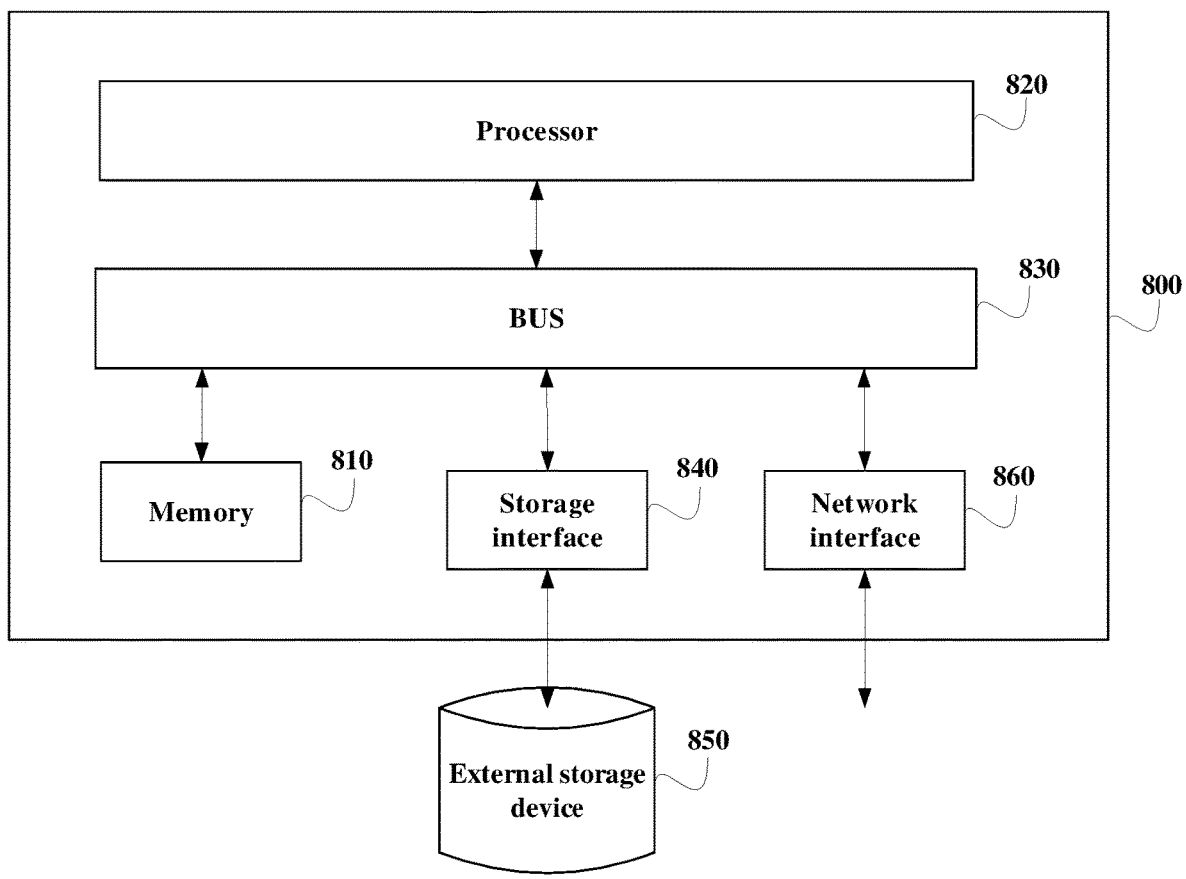
FIG. 8 is a schematic structural diagram illustrating a medical system according to another embodiment of the present disclosure.

In some embodiments, as illustrated in FIG. 8, a medical system 800 comprises a memory 810 and a processor 820. The processor 820 is coupled to the memory 810 via a bus 830. The medical system 800 may be further connected to an external storage device 850 through a storage interface 840 to access external data, and may be further connected to a network or another computer system (not shown) through a network interface 860, which will not be described in detail herein.

In the embodiment, data and instructions are stored in the memory, and the above instructions are executed by the processor, which can facilitate the operation and maintenance management of the system, and reduce a burden of the maintenance operation as much as possible.

In other embodiments, the present disclosure further provides a non-transitory computer-readable storage medium having computer program instructions stored thereon that, when executed by a processor, implement the method steps of the embodiment corresponding to at least one of FIGS. 1 to 4. One skilled in the art should understand that, the embodiments of the present disclosure may be provided as a method, an apparatus, or a computer program product. Therefore, embodiments of this disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical memory, etc.) having computer-usable program code embodied therein.

The present disclosure has been described with reference to flow charts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing apparatus to generate a machine such that the instructions executed by a processor of a computer or other programmable data processing apparatus to generate means implementing the functions specified in one or more flows of the flowcharts and/or one or more blocks of the block diagrams.

The computer program instructions may also be stored in a computer readable storage device capable of directing a computer or other programmable data processing apparatus to operate in a specific manner such that the instructions stored in the computer readable storage device produce an article of manufacture comprising instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

Heretofore, various embodiments of the present disclosure have been described in detail. In order to avoid obscuring the concepts of the present disclosure, some details known in the art are not described. Based on the above description, those skilled in the art can understand how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments or equivalently substitution of part of the technical features may be made without departing from the scope and spirit of the present disclosure. The scope of the present disclosure is defined by the appended claims.

What is claimed is:

1. An authority management method for a medical system, comprising:
   In response to a role setting operation of a first-level administrator corresponding to a medical group layer, creating a second-level administrator for a hospital and assigning a menu, a function, and a data access authority corresponding to the second-level administrator to the second-level administrator, wherein the hospital is a subordinate institution of the medical group layer;
   assigning a menu, a function, and a data access authority corresponding to a user to the user in response to a role setting operation of the second-level administrator;
   adding, deleting, or modifying organization architecture information in the medical system in response to an organization maintenance operation of the first-level administrator; and
   in a process of modifying the organization architecture information, modifying a parent institution corresponding to a currently adjusted institution and ensuring that an address identification of the currently adjusted institution remains unchanged, wherein historical medical data of the currently adjusted institution is stored to the address identification.

2. The authority management method according to claim 1, wherein:
   the hospital comprises: a first hospital and a second hospital different from the first hospital;
   the second-level administrator comprises: a first administrator and a second administrator different from the first administrator,
   wherein a menu, a function, and a data access authority corresponding to the first administrator are different from a menu, a function, and a data access authority corresponding to the second administrator.

3. The authority management method according to claim 1, wherein the user comprises: a first user and a second user different from the first user,
   wherein a menu, a function, and a data access authority corresponding to the first user are different from a menu, a function, and a data access authority corresponding to the second user.

4. The authority management method according to claim 1, further comprising:
   adding, deleting or modifying department information in an architecture of the hospital in response to a department maintenance operation of the second-level administrator.

5. The authority management method according to claim 1, further comprising:
   configuring administrator information of the second-level administrator in response to an information configuration operation of the first-level administrator; and
   configuring user information of the user in response to an information configuration operation of the second-level administrator.

6. The authority management method according to claim 1, further comprising:
   configuring a plurality of menu functions in response to a menu setting operation of the first-level administrator, wherein each of the plurality of menu functions corresponds to a role identification of at least one of the first-level administrator, the second-level administrator or the user.

7. The authority management method according to claim 1, wherein the organization architecture information is in a form of a tree menu, and comprises a region and a hospital, wherein the region comprises a subcategory comprising the hospital or a next level region, and the hospital is a lowest-level node of the organization architecture information.

8. A medical system, comprising:
   a memory; and
   a processor coupled to the memory, the processor configured to, based on instructions stored in the memory,
   in response to a role setting operation of a first-level administrator corresponding to a medical group layer, create a second-level administrator for a hospital and assign a menu a function, and a data access authority corresponding to the second-level administrator to the second-level administrator, wherein the hospital is a subordinate institution of the medical group layer,
   assign a menu, a function, and a data access authority corresponding to a user to the user in response to a role setting operation of the second-level administrator, add, delete, or modify organization architecture information in the medical system in response to an organization maintenance operation of the first-level administrator, and in a process of modifying the organization architecture information, modify a parent institution corresponding to a currently adjusted institution and ensure that an address identification of the currently adjusted institution remains unchanged, wherein historical medical data of the currently adjusted institution is stored to the address identification.

9. A non-transitory computer-readable storage medium on which computer program instructions are stored, wherein the computer program instructions, when executed by a processor, cause the processor to:

in response to a role setting operation of a first-level administrator corresponding to a medical group layer create a second-level administrator for a hospital and assign a menu, a function, and a data access authority corresponding to the second level administrator to the second-level administrator, wherein the hospital is a subordinate institution of the medical group layer;

assign a menu, a function and a data access authority corresponding to a user to the user in response to a role setting operation of the second-level administrator:

add, delete, or modify organization architecture information in the medical system in response to an organization maintenance operation of the first-level administrator; and in a process of modifying the organization architecture information, modify a parent institution corresponding to a currently adjusted institution and ensure that an address identification of the currently adjusted institution remains unchanged, wherein historical medical data of the currently adjusted institution is stored to the address identification.

\* \* \* \* \*